S. A. BRISBOIS.
VEHICLE WHEEL TIRE.
APPLICATION FILED APR. 9, 1917.
1,311,677.
Patented July 29, 1919.
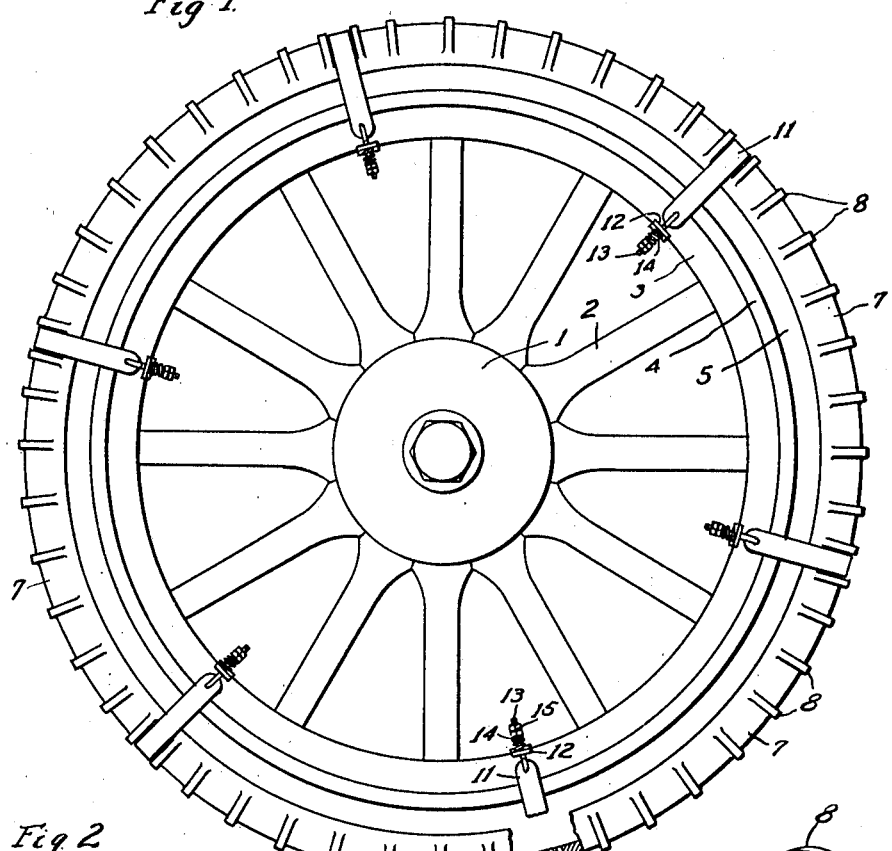
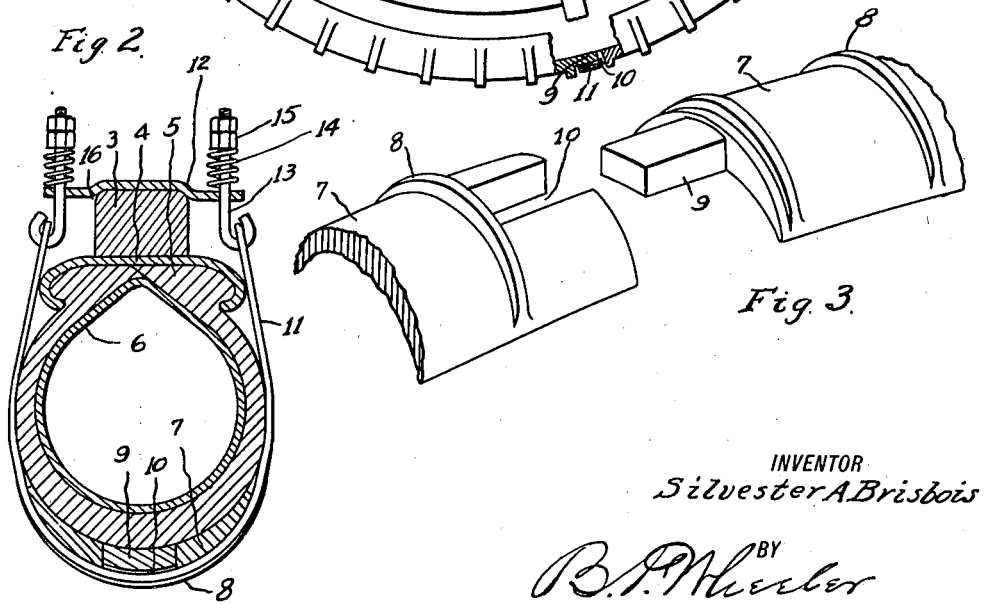
INVENTOR
Silvester A Brisbois
BY
B. P. Wheeler
ATTORNEY

UNITED STATES PATENT OFFICE.

SYLVESTER A. BRISBOIS, OF DETROIT, MICHIGAN.

VEHICLE-WHEEL TIRE.

1,311,677.  Specification of Letters Patent.  Patented July 29, 1919.

Application filed April 9, 1917. Serial No. 160,621.

*To all whom it may concern:*

Be it known that I, SYLVESTER A. BRISBOIS, a citizen of the United States, residing at Detroit, in the county of Wayne and State of Michigan, have invented a new and useful Vehicle-Wheel Tire, of which the following is a specification.

This invention relates to armored pneumatic tires for vehicle wheels, and its object is to provide a protective metallic tread member or shoe that will embrace the tread portion of a pneumatic tire, and positively protect the latter from being punctured or cut.

In attaining this object, the invention contemplates employing an armor comprised of concavo-convex metallic sections, transversely ribbed to insure good traction, and interengaging at their ends with a certain freedom of circumferential motion, and the provision of means for clamping said armor to a pneumatic tire that will allow the sections to undergo such radial movement as the resiliency of the tire may necessitate without impeding the circumferential play of the sections. This object is accomplished by the construction hereinafter specifically described and illustrated in the accompanying drawings, wherein:

Figure 1 is a side view of a wheel carrying a pneumatic tire equipped with the sectional armor constituting the present invention, one of the joints of the armor being shown in section.

Fig. 2 is a cross-section of the rim, tire, and armor taken at one of the points of application of means for clamping the armor to the tire.

Fig. 3 is a detail perspective view of the correlated extremities of two adjacent sections, showing the provision for tongue and groove engagement of said sections.

Referring now to the parts of the invention by the reference characters applied thereto in the several views of the drawings, 1 designates the hub, 2 the spokes, 3 the felly, and 4 the rim of a vehicle wheel. Said wheel is of an ordinary construction and carries the usual pneumatic tire consisting of a casing 5 and inner tube 6. The tread portion of this tire is embraced by a sectional metallic armor comprising a series of concavo-convex sections 7 interengaged at their joints by means of a tongue 9 formed at one end of each section and extending into a groove 10 formed in the adjoining end of the adjacent section. For reasons to be presently explained, the outer faces of the tongues 9 will be slightly offset inwardly from the outer surfaces of the corresponding ends of the armor sections, while the outer surfaces of the grooved ends of the adjoining sections will be flush with the body portions of said sections. Preferably the thickness of the sections will be gradually reduced from their center portions to their lateral edges, as is best seen in Fig. 2. Said sections are similarly formed with circumferentially spaced transverse ribs 8, the height of which is varied in correspondence with the varying thickness of the sections. As is shown in the sectional portion of Fig. 1, the adjoining ends of the sections do not abut but have a sufficient clearance to allow the sections to undergo such radial or circumferential movement as is necessary in view of the resiliency of the tire.

To retain the sectional armor in engagement with the tire, clamping means are employed, one of which is located at each joint of the armor. A flexible metal clamping band 11 embraces the grooved end of each armor section, its extremities being extended inwardly at each side of the tire. A correlated clamping member 12 bears against the inner face of the felly 3, with its extremities projecting slightly beyond said felly at each side of the same. Through the projecting ends of the member 12, there are loosely passed hooked pins 13, the hooks of which respectively engage the ends of the clamping band 11. Said pins are yieldably subjected to a pressure acting toward the wheel center by springs 14 mounted thereupon, between the member 12 and nuts 15 upon the threaded shanks of the pins.

Preferably the end portions of the members 12 will be slightly offset outwardly from the center portions thereof so that the shoulders 16 thus produced will resist any force tending to displace said members laterally of the felly.

Owing to the inward offsetting of the outer face of the tongues 9, as previously described, the bands 11 will embrace and clamp the grooved ends of the sections but will be spaced slightly from said tongues, so that the latter will be retained in the grooves 10 without prevention of the slight radial or circumferential movement which said ends must undergo as the tire flexes, The springs 14 perform an important function in preventing the armor from interfering with flexing of the tire. The ribs 8 serve to compensate to a large extent for the decrease in traction resulting from the substitution of a metallic tread surface for the usual rubber tread, and act also to strongly reinforce the armor sections and to prevent wear of the bodies thereof and of the bands 11.

What I claim is:

1. In a device of the character described, the combination with a vehicle wheel and a resilient tire mounted thereupon, of an armor for said tire comprising an annular series of concavo-convex metallic sections embracing the tread portion of the tire, clamping bands embracing said sections at their joints, respectively having inwardly projecting extremities at each side of the tire, an apertured member bearing against the inner faces of the rim opposite each of said bands and projecting at each side of the rim, bolts engaged with the respective extremities of said bands passing through said apertured members, springs mounted upon said bolts having ends abutting against said apertured members, and abutments for the other ends of said springs upon said bolts.

2. In a device of the character described, the combination with a vehicle wheel and a resilient tire mounted thereupon, of an armor for said tire comprising an annular series of concavo-convex metallic sections embracing the tread portion of the tire and formed with transverse ribs, and a radially yieldable connection between each section and the rim of the wheel for clamping the sections to the tire, said connections being engaged between ribs of the sections to prevent circumferential movement of the sections relative to the connections.

In testimony whereof I sign this specification.

SYLVESTER A. BRISBOIS.